(12) United States Patent
Farag

(10) Patent No.: US 7,048,035 B2
(45) Date of Patent: May 23, 2006

(54) CASING FOR A HEAT EXCHANGE SYSTEM

(75) Inventor: Ashraf A. Farag, Williamsville, NY (US)

(73) Assignee: Delphi Technologies, Inc., Troy, MI (US)

( * ) Notice: Subject to any disclaimer, the term of this patent is extended or adjusted under 35 U.S.C. 154(b) by 173 days.

(21) Appl. No.: 10/350,572

(22) Filed: Jan. 23, 2003

(65) Prior Publication Data
US 2004/0144521 A1    Jul. 29, 2004

(51) Int. Cl.
*B60H 3/00*    (2006.01)
(52) U.S. Cl. .......................... 165/42; 165/122; 138/39; 62/428; 415/182.1; 415/208.1
(58) Field of Classification Search ................. 165/41, 165/42, 43, 44, 202, 203, 122; 138/39; 62/428; 415/182.1, 208.1, 208.2, 208.3
See application file for complete search history.

(56) References Cited

U.S. PATENT DOCUMENTS

| | | | |
|---|---|---|---|
| 2,808,237 A | * 10/1957 | Fosnes | 165/122 |
| 4,989,807 A | * 2/1991 | Foreman et al. | 138/39 |
| 5,531,484 A | * 7/1996 | Kawano | 138/39 |
| 6,146,092 A |   11/2000 | Botros et al. | 415/119 |
| 6,216,644 B1 | * 4/2001 | Eroglu et al. | 138/39 |
| 6,290,266 B1 | * 9/2001 | Kawano | 138/39 |
| 6,834,709 B1 | * 12/2004 | Shirota et al. | 165/42 |

FOREIGN PATENT DOCUMENTS

| | | | |
|---|---|---|---|
| JP | 408048128 A | * | 2/1996 |
| JP | 408072530 A | * | 3/1996 |
| JP | 408156577 A | * | 6/1996 |
| JP | 409123748 A | * | 5/1997 |
| JP | 02000001119 A | * | 1/2000 |
| JP | 02000280729 A | * | 10/2000 |

* cited by examiner

Primary Examiner—Ljiljana Ciric
(74) Attorney, Agent, or Firm—Patrick M. Griffin

(57) ABSTRACT

A casing for a heat exchange system defines a blower compartment (18), an evaporator compartment (20), and a diffuser (22). The diffuser (22) defines an exit (28) and an entry area in a cutoff plane (30). A vane wall (38) curves inwardly from the diffuser (22) and includes a plurality of parallel vanes (46), (48), (50), and (52). The plurality of vanes (46), (48), (50), and (52) include a first vane (46) and a second vane (48).

15 Claims, 4 Drawing Sheets

CASING FOR A HEAT EXCHANGE SYSTEM

BACKGROUND OF THE INVENTION

1. Field of the Invention

The subject invention relates to a casing for a heat exchange system.

2. Description of the Related Art

Various casings for heat exchange systems are well known in the prior art with the casings having various structures for improving airflow within the casing. An example of such a casing is disclosed in the U.S. Pat. No. 6,146,092 to Botros et al.

The Botros '092 patent discloses a casing for a heat exchange system including a top surface, a bottom surface, and a peripheral wall. The peripheral wall extends between the surfaces and about a periphery thereof. The wall defines a cylindrical blower compartment, an evaporator compartment, and a channel. The wall extends tangentially from the cylindrical blower compartment to define an outer wall of the channel. The wall further extends between the blower compartment and the evaporator compartment to define an inner wall of the channel. The inner and outer walls of the channel are curved to prevent airflow separation and to reduce noise.

It is also known in the prior art to have casings with a peripheral wall defining one or more angled or ramped portions. The angled or ramped portions are at an end of the peripheral wall to direct a flow of air into an evaporator compartment.

Although the prior art discloses curved walls and angled or ramped portions on the wall, there remains an opportunity to optimize the position and size of the angled or ramped portions to improve airflow uniformity across the evaporator compartment while minimizing drain on blower efficiency.

BRIEF SUMMARY OF THE INVENTION AND ADVANTAGES

The invention provides a casing for a heat exchange system comprising a top surface, a bottom surface, and a peripheral wall extending between the surfaces and about a periphery of the surfaces. The peripheral wall defines a blower compartment, an evaporator compartment, and a diffuser extending between the compartments for facilitating airflow from the blower compartment to the evaporator compartment. The diffuser defines an exit for establishing a direction of airflow into the evaporator compartment. The peripheral wall further extends from the exit to define a vane wall of the evaporator compartment. The vane wall curves inwardly from the exit of the diffuser into the evaporator compartment for redirecting air flow exiting the diffuser. A plurality of parallel vanes are disposed in spaced relationship along and transverse to the direction of the vane wall. The plurality of vanes include a first vane proximal to the diffuser and a second vane spaced from the first vane on the opposite side thereof from the exit of the diffuser for redirecting the air flow across the evaporator compartment.

BRIEF DESCRIPTION OF THE SEVERAL VIEWS OF THE DRAWINGS

Other advantages of the present invention will be readily appreciated, as the same becomes better understood by reference to the following detailed description when considered in connection with the accompanying drawings wherein.

DETAILED DESCRIPTION OF THE PREFERRED EMBODIMENT

Figure 1:
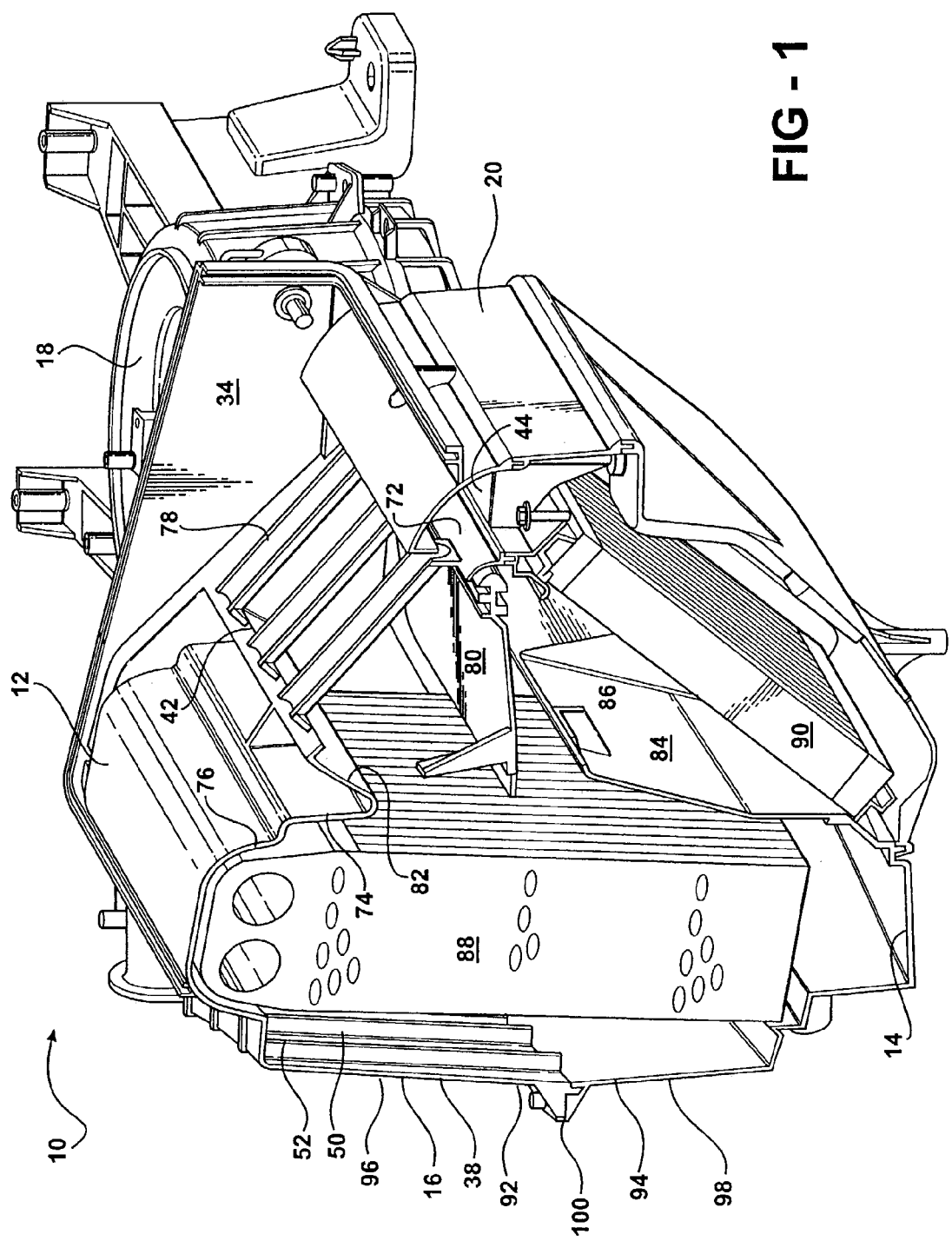
FIG. 1 is a perspective view of a heat exchange system including a cutaway view of an evaporator compartment.

Referring to the Figures, wherein like numerals indicate like or corresponding parts throughout the several views, a casing for a heat exchange system is generally shown at 10 in FIG. 1.

Figure 3:
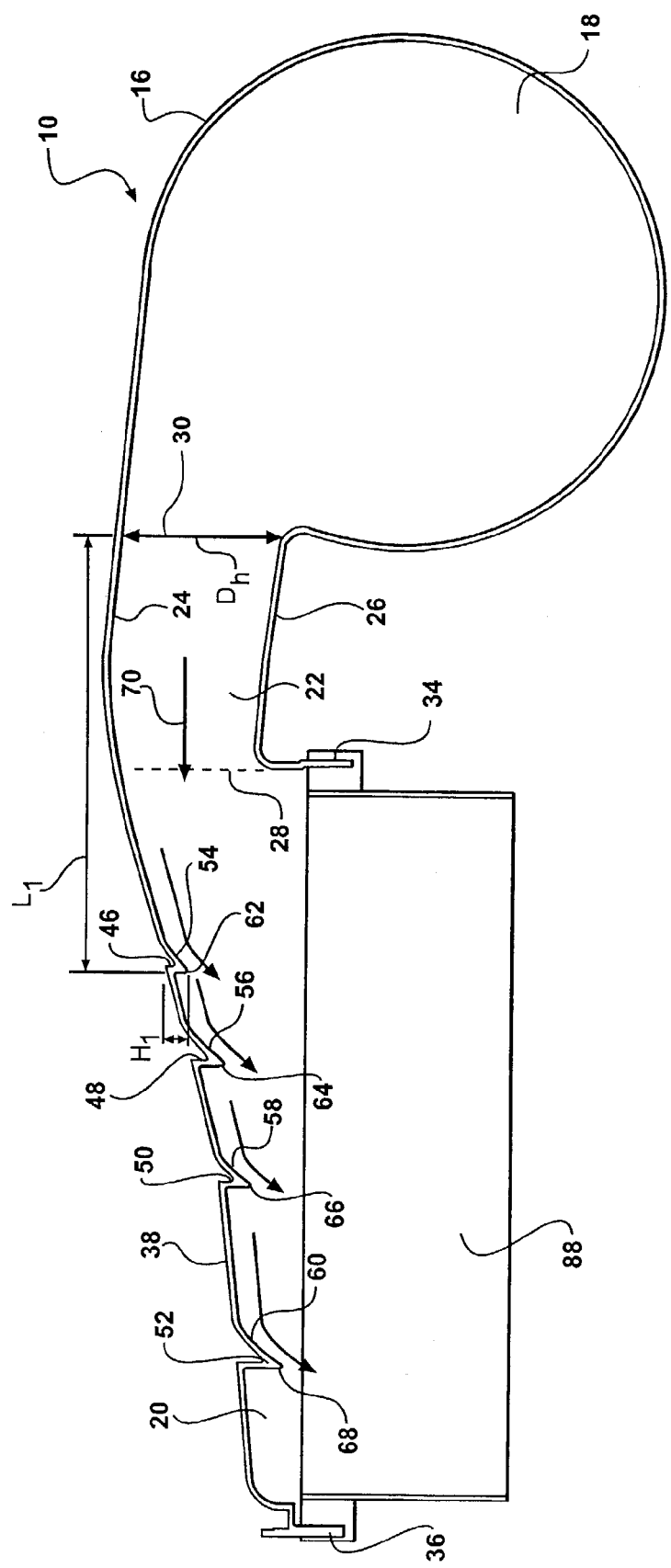
FIG. 3 is a cross-sectional top view of a blower compartment, a diffuser, and the evaporator compartment.

The casing 10 includes a top surface 12, a bottom surface 14, and a peripheral wall 16. The peripheral wall 16 extends between the surfaces 12 and 14 and about a periphery thereof. As also shown in FIG. 3, the wall 16 defines a blower compartment 18, an evaporator compartment 20, and a diffuser 22. The wall 16 further defines a portion of the blower compartment 18 in a cylindrical shape and extends tangentially from the cylindrical blower compartment 18 to define an outer wall 24 of the diffuser 22. The wall 16 further extends between the blower compartment 18 and the evaporator compartment 20 to define an inner wall 26 of the diffuser 22.

The diffuser 22 extends between the compartments 18 and 20 for facilitating airflow from the blower compartment 18 to the evaporator compartment 20. The diffuser 22 defines an exit 28 for establishing a direction of airflow into the evaporator compartment 20. The diffuser 22 also defines an entry area in a cutoff plane 30 at the entry to the diffuser 22 from the cylindrical blower compartment 18. The cutoff plane 30 is transverse to the diffuser 22. A hydraulic diameter $D_h$ is calculated from the entry area by taking the square root of the entry area divided by pi ($\pi$). The hydraulic diameter $D_h$ is significant in determining various properties of airflow through the casing.

Figure 2:
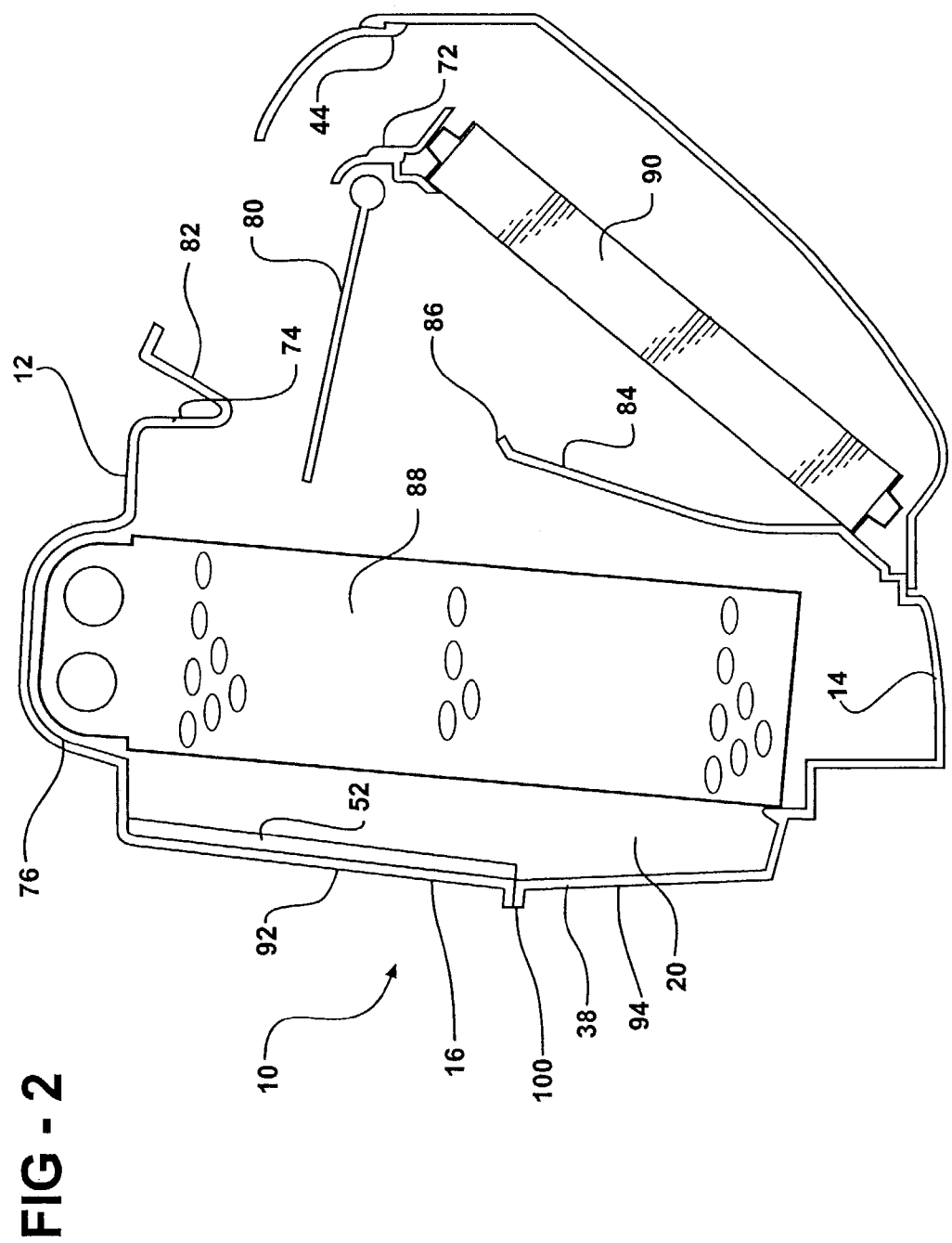
FIG. 2 is a cross-sectional side view of the evaporator compartment.

A first side wall 34 of the evaporator compartment 20 is defined by the wall 16 extending transversely from the inner wall 26 of the diffuser 22. A second side wall 36 of the evaporator compartment 20 is defined by the wall 16 extending transversely to the diffuser 22, spaced from the first side wall 34. The wall 16 extends from the exit 28 of the diffuser 22 to define a vane wall 38 of the evaporator compartment 20. The wall 16 defines a groove between the vane wall 38 and the second side wall 36 through which pipes pass to reach an evaporator 88. As shown in FIGS. 1 and 2, the wall 16 and top surface 12 define a vent therebetween, opposite the vane wall 38 and between the first 34 and the second 36 side walls.

Referring to FIG. 3, the vane wall 38 curves inwardly from the exit 28 of the diffuser 22 for redirecting airflow exiting the diffuser 22. A plurality of parallel vanes 46, 48, 50, and 52 are disposed in spaced relationship along and transverse to the direction of the vane wall 38. The plurality of vanes 46, 48, 50, and 52 include a first vane 46 proximal to the diffuser 22 and a second vane 48 spaced apart from the first vane 46 on the opposite side thereof downstream from the exit 28 of the diffuser 22. A third vane 50 is disposed further downstream from the second vane 48, on the opposite side from the first vane 46. Also, a fourth vane 52 is disposed downstream from the third vane 50, on the opposite side from the second vane 48. The vanes 46, 48, 50, 52 increase in height from the first vane 46 to the fourth vane 52. The distance between the vanes 46, 48, 50, 52 also increases from the first vane 46 to the second vane 48, the second vane 48 to the third vane 50, and the third vane 50 to the fourth vane 52. Each of the vanes 46, 48, 50, and 52 have a forward wall 54, 56, 58, and 60 that intersects the vane wall 38 and extends to a peak 62, 64, 66, and 68.

Since the vanes 46, 48, 50, 52 increase in height, the peak 64 of the second vane 48 is positioned above the peak 62 of the first vane 46 relative to a plane 70 transverse to the exit 28 and parallel to the direction of air flow out of the exit 28. Also, the peak 66 of the third vane 50 is positioned above the peak 64 of the second vane 48 and the peak 68 of the fourth vane 52 is positioned above the peak 66 of the third vane 50. Alternatively, the intersection of the forward wall 56 of the second vane 48 and the vane wall 38 is at least as high as the peak 62 of the first vane 46 relative to the plane 70.

The first vane 46 is positioned from the cutoff plane 30 a distance $L_1$ of not greater than 1.9 times $D_h$, or the square root of the entry area divided by pi ($\pi$). Furthermore, the first vane 46 has a height $H_1$ of not greater than 6% $D_h$, or the square root of the entry area divided by pi ($\pi$).

The vanes 46, 48, 50, and 52 smoothly direct the air entering through the diffuser 22 and improve the air distribution across the evaporator 88, which is essential for better system performance. The spatial relationship between the first vane 46 and the second vane 48 with respect to the direction of air flow is important to minimize drain on blower efficiency and improve circulation of the air. The position $L_1$ and height $H_1$ of the first vane 46 are also important with respect to blower efficiency and uniformity of the airflow distribution across the evaporator 88. The number of succeeding vanes behind the second vane 48 are dependent on the extent to which air uniformity is needed.

Referring to FIGS. 1 and 2, a support 72 extends between the first 34 and the second 36 side walls, to define a first 42 vent, where cold air goes through, and a second 44 vent, where hot air goes through. A radial baffle 74 extends between the first 34 and the second 36 side walls. The radial baffle 74 is disposed between the first vent 42 and a concave portion 76 of the top surface 12. A plurality of ribs 78 are dispersed in the first vent 42. The ribs 78 angularly extend between a base of the radial baffle 74 and the support 72.

A door 80 is rotatably hinged adjacent the support 72. The door 80 extends between the first 34 and the second 36 side walls. The radial baffle 74 defines a curved side 82 adjacent the first vent 42 which is complementary to a curved path mapped by the door 80 as the door 80 rotates. The air flows exclusively through the second vent 44 when the door 80 is adjacent the radial baffle 74, this is known as heater full hot mode.

A heater flange 84 extends from the bottom surface 14 of the evaporator compartment 20 between the first 34 and the second 36 side walls. The heater flange 84 defines a top edge 86 for communicating with the door 80 such that the air flows exclusively through the first vent 42 when the door 80 is in contact with the heater flange 84, this is known as vent full cold mode. The door 80 controls airflow temperature by rotating between the radial baffle 74 and the heater flange 84.

A centrifugal blower (not shown) is situated in the blower compartment 18 and supplies air to the heat exchange system 10. The evaporator 88 is situated in the evaporator compartment 20 and spans between the first 34 and second 36 side walls. The evaporator 88 cools the air supplied by the centrifugal blower. A heater 90 is situated between the support 72 and the bottom surface 14 of the evaporator compartment 20. The heater 90 spans between the first 34 and second 36 side walls such that air passing through the heater 90 exits the casing 10 through the second vent 44.

Figure 4:
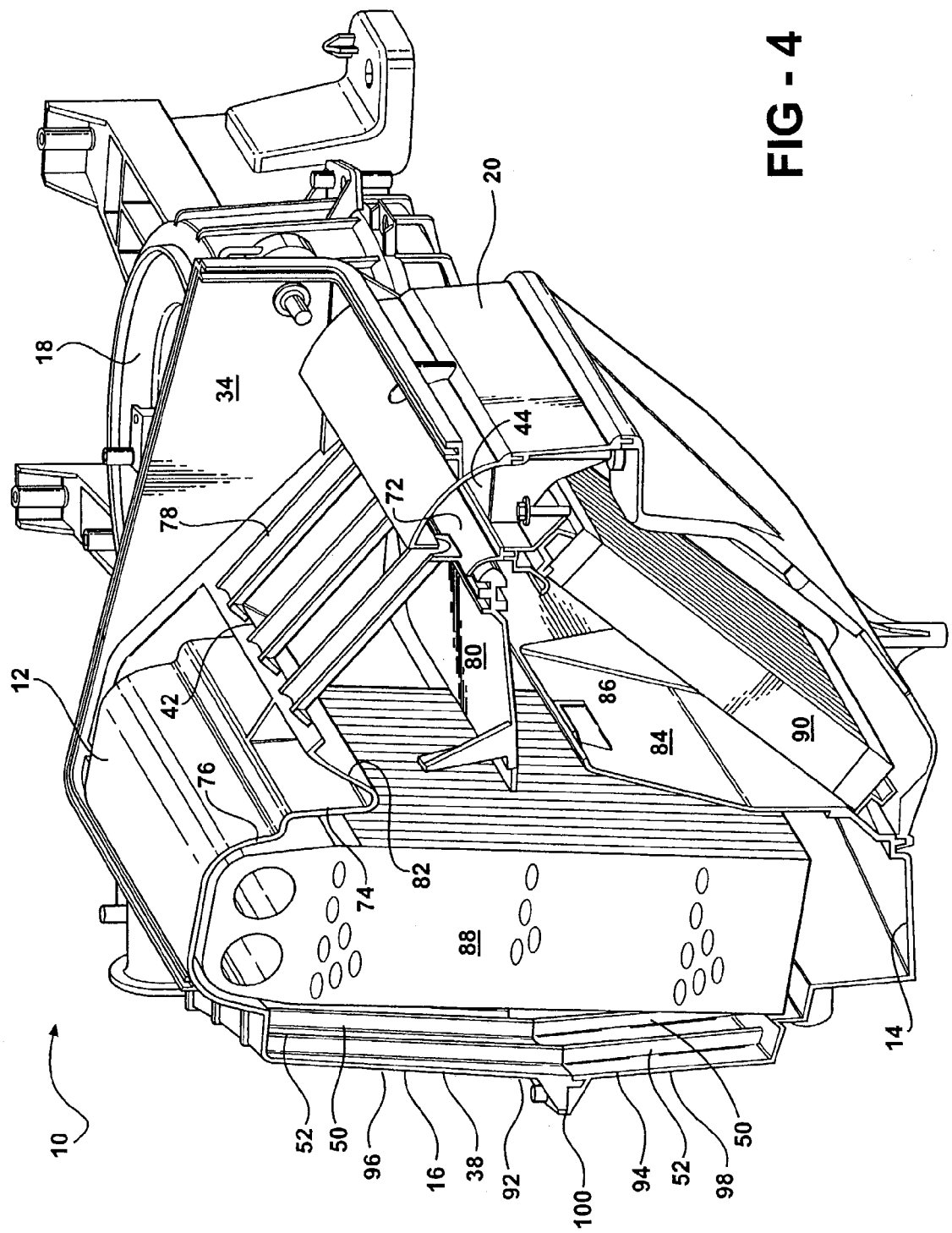
FIG. 4 is a perspective view of another embodiment of an alternative heat exchange system including a cutaway view of an evaporator compartment.

Preferably, as shown in FIGS. 1 and 2, the casing 10 includes a top piece 92 and a bottom piece 94. The top piece 92 includes an upper portion 96 of the wall 16, which surrounds the top surface 12 and extends downwardly to an open periphery. The bottom piece 94 includes a lower portion 98 of the wall 16 complementary to the upper portion 96 of the wall 16 of the top piece 92 and extending upwardly to an open periphery. A plurality of complementary tabs 100 are disposed along the periphery of both the upper 96 and lower 98 portions of the wall 16 for securing the top piece 92 to the bottom piece 94. In the embodiment of FIGS. 1 and 2, the vanes 46, 48, 50, and 52 are only disposed on the top piece 92. Alternatively, in the embodiment of FIG. 4, the vanes 46, 48, 50, and 52 can be disposed on both the top piece 92 and the bottom piece 94.

Obviously, many modifications and variations of the present invention are possible in light of the above teachings and the invention may be practiced otherwise than as specifically described within the scope of the appended claims.

What is claimed is:

1. A casing for a heat exchange system comprising:
    a top surface (12) and a bottom surface (14);
    a peripheral wall (16) extending between said surfaces (12, 14) and about a periphery of said surfaces (12, 14) with said peripheral wall (16) defining a cylindrical blower compartment (18), an evaporator compartment (20), and a diffuser (22) extending between said compartments (18, 20) for facilitating air flow from said blower compartment (18) to said evaporator compartment (20);
    said diffuser (22) defining an entry area in a cutoff plane (30) at an entry to said diffuser (22) from said cylindrical blower compartment (18) with said cutoff plane (30) being transverse to said diffuser (22) and an exit (28) for establishing a direction of air flow into said evaporator compartment (20), and said peripheral wall (16) further extending from said exit (28) to define a vane wall (38) of said evaporator compartment (20);
    said vane wall (38) curving inwardly from said exit (28) of said diffuser (22) into said evaporator compartment (20) for redirecting air flow exiting said diffuser (22);
    a plurality of parallel vanes (46, 48, 50, 52) disposed in spaced relationship along and substantially transverse to the direction of said vane wall (38) with said plurality of vanes (46, 48, 50, 52) including a first vane (46) proximal said diffuser (22) and a second vane (48) spaced from said first vane (46) on the opposite side thereof downstream from said exit (28) of said diffuser (22) for redirecting the airflow across said evaporator compartment (20); and
    said first vane being positioned from said cutoff plane (30) at a distance ($L_1$) of not greater than 1.9 times the square root of said entry area divided by the value of pi.

2. A casing as set forth in claim 1 wherein said first vane (46) has a height ($H_1$) of not greater than six percent of the square root of said entry area divided by the value of pi.

3. A casing as set forth in claim 2 wherein said peripheral wall (16) defines an outer wall (24) and an inner wall (26) of said diffuser (22).

4. A casing as set forth in claim 3 further including a first side wall (34) of said evaporator compartment (20) defined by a portion of said peripheral wall (16) extending transversely to said inner wall (26) of said diffuser (22) and including a second side wall (36) of said evaporator compartment (20) defined by a portion of said peripheral wall (16) extending transversely to outer wall (24) of said diffuser (22) and spaced from said first side wall (34).

5. A casing as set forth in claim 4 wherein said peripheral wall (16) and said top surface (12) define a vent therebetween, opposite said vane wall (38) and between said first (34) and said second (36) side walls, said vent is divided by a support (72) extending between said first (34) and said second (36) side walls to define a first vent (42) and a second vent (44).

6. A casing as set forth in claim 5 wherein said top surface (12) of said evaporator compartment (20) defines a concave portion (76) extending between said first (34) and said second (36) side walls and a radial baffle (74) extending between said first (34) and said second (36) side walls and disposed between said first vent (42) and said concave portion (76) of said top surface (12).

7. A casing as set forth in claim 6 including a door (80) rotatably hinged adjacent said support (72) and extending between said first (34) and said second (36) side walls, said radial baffle (74) defining a curved side (82) adjacent said first vent (42) complementary to a curved path mapped by said door (80) as said door (80) rotates.

8. A casing as set forth in claim 7 further including a heater flange (84) extending from said bottom surface (14) of said evaporator compartment (20) between said first (34) and said second (36) side walls, said heater flange (84) defining a top edge (86) for communicating with said door (80) such that said airflow flows exclusively through said first vent (42) when said door (80) is in contact with said heater flange (84), said door (80) controlling airflow by rotating between said vent flange (74) and said heater flange (84).

9. A casing as set forth in claim 8 further including a heater (90) situated between said support (72) and said bottom surface (14) of said evaporator compartment (20) and spanning between said first (34) and said second (36) side walls such that air passing through said heater (90) exits said casing (10) through said second vent (44).

10. A casing as set forth in claim 1 wherein said casing (10) is comprised of a top piece (92) and a bottom piece (94).

11. A casing as set forth in claim 10 wherein said vanes (46, 48, 50, 52) are disposed on only one of said top (92) and bottom (94) pieces of said casing (10).

12. A casing as set forth in claim 10 wherein said vanes (46, 48, 50, 52) are disposed on both of said top (92) and bottom (94) pieces of said casing (10).

13. A casing as set forth in claim 10 wherein said top piece (92) includes an upper portion (96) of said peripheral wall (16) surrounding said top surface (12) and extending downwardly toward said bottom piece (94).

14. A casing as set forth in claim 13 wherein said bottom piece (94) includes a lower portion (98) of said peripheral wall (16) complementary to said upper portion (96) of said peripheral wall (16) of said top piece (92).

15. A casing as set forth in claim 14 further including a plurality of complementary tabs (100) disposed along the periphery of both the upper (96) and lower (98) portions of said peripheral wall (16) for securing said top piece (92) to said bottom piece (94).

* * * * *